US008971703B2

(12) United States Patent
Yamazaki et al.

(10) Patent No.: US 8,971,703 B2
(45) Date of Patent: Mar. 3, 2015

(54) WAVELENGTH DISPERSION AMOUNT ESTIMATION METHOD, WAVELENGTH DISPERSION COMPENSATION CIRCUIT, AND RECEPTION DEVICE

(75) Inventors: Etsushi Yamazaki, Musashino (JP); Takayuki Kobayashi, Musashino (JP); Masahito Tomizawa, Musashino (JP); Riichi Kudo, Musashino (JP); Koichi Ishihara, Musashino (JP); Tadao Nakagawa, Musashino (JP); Mitsuteru Ishikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 26 days.

(21) Appl. No.: 13/982,507

(22) PCT Filed: Feb. 1, 2012

(86) PCT No.: PCT/JP2012/052318
§ 371 (c)(1),
(2), (4) Date: Sep. 5, 2013

(87) PCT Pub. No.: WO2012/105628
PCT Pub. Date: Aug. 9, 2012

(65) Prior Publication Data
US 2013/0343749 A1 Dec. 26, 2013

(30) Foreign Application Priority Data

Feb. 1, 2011 (JP) .................................. 2011-019499

(51) Int. Cl.
*H04B 10/00* (2013.01)
*H04B 10/12* (2006.01)
(Continued)

(52) U.S. Cl.
CPC ........... *H04B 10/616* (2013.01); *G01M 11/338* (2013.01); *H04B 10/07951* (2013.01)
USPC ............. 398/29; 398/147; 398/158; 398/154; 398/155; 398/159

(58) Field of Classification Search
CPC ........... H04B 10/2507; H04B 10/2513; H04B 2210/25; H04B 2210/252; H04B 2210/254; H04B 2210/256
USPC .............. 398/29, 81, 147, 158, 159, 154, 155
See application file for complete search history.

(56) References Cited

U.S. PATENT DOCUMENTS 7,477,848 B2 * 1/2009 Ooi et al. ...................... 398/147
7,536,108 B2 * 5/2009 Hirano et al. ................. 398/147

(Continued)

FOREIGN PATENT DOCUMENTS

EP 2 214 333 A1 8/2010
EP 2 456 097 A1 5/2012

(Continued)

OTHER PUBLICATIONS

English translation of Written Opinion of the International Searching Authority dated Mar. 13, 2012, 4 pp.

(Continued)

*Primary Examiner* — Dalzid Singh
(74) *Attorney, Agent, or Firm* — Ohlandt Greeley Ruggiero & Perle L.L.P.

(57) ABSTRACT

A wavelength dispersion amount estimation method, a wavelength dispersion compensation circuit, and a receiving device which rapidly estimate and set a wavelength dispersion amount to compensate with high accuracy at the receiving device which compensates waveform distortion at an optical fiber transmission path. The wavelength dispersion compensation circuit includes an analog-digital converter which converts an optical analog waveform received from the optical fiber transmission path to a digital signal, a digital signal processor which compensates waveform distortion of the digital signal output from the analog-digital converter due to wavelength dispersion at the optical fiber transmission path with a dispersion compensation amount estimated with the wavelength dispersion amount estimation method, and a symbol clock extractor which extracts a symbol arrival timing clock of received data contained in the digital signal output from the analog-digital converter and outputs strength of the symbol arrival timing clock as the clock detection value.

30 Claims, 5 Drawing Sheets

(51) Int. Cl.
*H04B 10/08* (2006.01)
*H04B 17/00* (2006.01)
*H04B 10/61* (2013.01)
*G01M 11/00* (2006.01)
*H04B 10/079* (2013.01)

(56) References Cited

U.S. PATENT DOCUMENTS

| | | | |
|---|---|---|---|
| 2003/0163771 | A1 | 8/2003 | Tomofuji et al. |
| 2009/0080902 | A1 | 3/2009 | Noheji et al. |
| 2010/0196017 | A1 | 8/2010 | Tanimura et al. |
| 2012/0099864 | A1* | 4/2012 | Ishihara et al. ............ 398/65 |

FOREIGN PATENT DOCUMENTS

| | | |
|---|---|---|
| JP | 2001-053679 A | 2/2001 |
| JP | 2009-169518 A | 7/2009 |
| JP | 2010-178222 A | 8/2010 |
| JP | 2010178222 A | 8/2010 |
| WO | 9948231 A1 | 9/1999 |
| WO | WO 99/48231 | 9/1999 |
| WO | WO 2007/141846 A1 | 12/2007 |
| WO | WO 2009/144997 A1 | 12/2009 |
| WO | WO 2011/007803 A1 | 1/2011 |

OTHER PUBLICATIONS

English translation of the International Preliminary Report on Patentability dated Aug. 15, 2013, 2 pp.

Masuda, et al.; "13.5-Tb/s (135×111-Gb/s/ch) No-Guard-Interval Coherent OFDM Transmission over 6,248 km using SNR Maximized Second-order DRA in the Extended L-Band"; 2009; OSA/OFC/NFOEC; PDPB5; 3 pages.

Yu, et al.; "17 Tb/s (161×114 Gb/s) PolMux-RZ-8PSK transmission over 662 km of ultra-low loss fiber using C-band EDFA amplification and digital coherent detection"; vol. 7-27 to vol. 7-28; ECOC 2008, Sep. 21-25, 2008, Th.3.E.2; Brussels, Belgium.

Liu, et al.; "Initial Tap Setup of Constant Modulus Algorithm for Polarization De-multplexing in Optical Coherent Receviers", OSA/OFC/NFOEC 2009; 3 pages; OMT2.

International Search Report dated Mar. 13, 2012 (with English Translation) from corresponding PCT/JP2012/052318, 4 pages.

International Search Report dated Sep. 21, 2010 (with English Translation) from corresponding PCT/JP2012/061898, 5 pages.

* cited by examiner

WAVELENGTH DISPERSION AMOUNT ESTIMATION METHOD, WAVELENGTH DISPERSION COMPENSATION CIRCUIT, AND RECEPTION DEVICE

TECHNICAL FIELD

The present invention, being used for optical communications, relates to a wavelength dispersion amount estimation method, a wavelength dispersion compensation circuit, and a receiving device which compensate waveform distortion due to wavelength dispersion, cross polarization interference, polarization mode dispersion, and the like at an optical fiber transmission path using a digital signal process.

BACKGROUND ART

In the field of optical communications, a communication system combining a synchronous detection method which dramatically improves frequency usage efficiency and signal processing is attracting attention. Compared to a system constructed with direct detection, it is known to be capable of compensating waveform distortion of transmitting signals due to wavelength dispersion and polarization mode dispersion received owing to optical fiber transmission by receiving as digital signals in addition to improving receiving sensitivity. Therefore, introducing as an optical communication technology of the following generation is considered.

A digital coherent method represented by Non-Patent Literatures 1 and 2 adopts a method to compensate quasi-static wavelength dispersion with a fixed digital filter (e.g., a tap number of 2048 taps with a dispersion of 20000 ps/nm against a signal of 28 Gbaud) and to compensate polarization mode dispersion having variation with an adaptive filtering with the small tap number (e.g., about 10 to 12 taps for polarization mode dispersion of 50 ps) using blind algorithm.

CITATION LIST

Patent Literature

Patent Literature 1: Japanese Patent Application Laid-Open No. 2001-053679
Patent Literature 2: WO/2009/144997
Patent Literature 3: Japanese Patent Application No. 2009-169518
Patent Literature 4: WO/2011/007803

Non-Patent Literature

Non-Patent Literature 1: H. Masuda, et. al., "13.5-Tb/s (135× 111-Gb/s/ch) No-Guard-Interval Coherent OFDM Transmission over 6,248 km using SNR Maximized Second-order DRA in the Extended L-band," OSA/OFC/NFOEC 2009, PD PBS.
Non-Patent Literature 2: Jianjun Yu, et. al., "17 Tb/s (161× 114 Gb/s) PolMux-RZ-8PSK transmission over 662 km of ultra-low loss fiber using C-band EDFA amplification and digital coherent detection," ECOC 2008, Th. 3. E. 2, Brussels, Belgium, 21-25 Sep. 2008.
Non-Patent Literature 3: L. liu, et al., "Initial Tap Setup of Constant Modulus Algorithm for Polarization De-multiplexing in Optical Coherent Receivers," OSA/OFC/NFOEC 2009, OMT 2.

SUMMARY OF INVENTION

Technical Problem

In a transmission system, waveform distortion due to wavelength dispersion applied at a transmission path is compensated with digital signal processing of a receiving terminal at the receiving terminal. Here, there are types of transmission fiber such as single mode fiber, dispersion shift fiber, and non-zero dispersion shift fiber and a wavelength dispersion amount which a signal receives at the transmission path per unit length differs. Further, since an accumulative wavelength dispersion amount increases in proportion to a length of the transmission path fiber through which signal light transmitted, an accumulative dispersion amount varies due to the transmitting distance. In a case that an optical dispersion compensation instrument is inserted to a repeater of the transmitting system, a residual dispersion amount varies owing to the compensation amount thereof. Further, there are cases that a dispersion compensation fiber is used as a transmitting path for a submarine system and the like. Further, since a wavelength dispersion coefficient varies owing to a carrier wavelength of signal light, accumulative dispersion amount is dependent on a wavelength of the signal light. Owing to the above reasons, a coefficient of a dispersion compensation filter should be controlled in accordance with the accumulative wavelength dispersion amount at the receiving terminal. Therefore, a mechanism to estimate the accumulative wavelength dispersion amount which the signal receives is required.

As a conventional art of detecting an optimum wavelength dispersion compensation amount, there is a method of using a characteristic that quality of received signal drops which occurs owing to residual wavelength distortion due to wavelength dispersion. For example, residual wavelength distortion due to wavelength dispersion increases an error rate. Accordingly, there is a method to control a set value for the wavelength dispersion compensation circuit so that the error rate calculated by comparing a known signal pattern and a received pattern becomes small, for example. Further, generally, a synchronous detection signal of a clock extracting-synchronizing circuit becomes small when residual wavelength distortion due to wavelength dispersion exists. There is a method to control the wavelength dispersion compensation amount making use of such characteristics (e.g., see Patent Literature 1). Further, a method using an opening degree of an eye pattern has been proposed (e.g., see Patent Literature 2).

However, according to these methods, when the accumulative wavelength dispersion amount which the received signal has received and the compensating amount at the dispersion compensation amount circuit largely differs, correlation between a compensating residual dispersion amount and variation of a monitor signal becomes extremely small, so that control of the dispersion compensation amount using the monitor signal becomes impossible. Therefore, a process such as to exhaustively vary and to sweep the dispersion compensation amount is required so that correlation between the residual dispersion amount and the monitor signal can be obtained with the residual dispersion amount. Accordingly, there has been a problem that setting time becomes long.

Meanwhile, a method to estimate a wavelength dispersion amount by inserting a known signal to transmitting signal light and using the known signal part at the receiving terminal from waveform variation of the known signal has been known as a method to rapidly detect the wavelength dispersion amount to compensate (e.g., see Patent Literature 3).

However, although the dispersion estimation method using the known signal is rapid, there is a problem that an error occurs for the estimation amount owing to waveform distortion due to polarization mode dispersion, nonlinear waveform distortion, and the like other than wavelength dispersion.

When an estimated value of wavelength dispersion is set as a compensation amount for the dispersion compensation circuit, waveform distortion due to wavelength dispersion remains even after compensation, so that an error rate increases in cases that an error exists between the actual value which ought to be compensated and the estimated value. Further, proof strength against distortion factors other than wavelength dispersion such as polarization mode dispersion becomes lowered. Accordingly, it is important to reduce the error of the wavelength dispersion compensation amount to operate an optical transmission system stably with high reliability.

As described above, there has been a problem that long time is required until detection for control using a monitor signal and occurrence of an estimation error is required to be considered for a dispersion estimation method using a known signal.

Then, the present invention aims to provide a wavelength dispersion amount estimation method, a wavelength dispersion compensation circuit, and a receiving device which rapidly estimate and set a wavelength dispersion amount to compensate with high accuracy at a receiving device which compensates waveform distortion at an optical fiber transmission path to resolve the above issues.

Solution to Problem

To achieve the above aim, the wavelength dispersion amount estimation method according to the present invention includes steps of:

(1) setting an arbitrary value as a first candidate value of a wavelength dispersion amount, (2) extracting plural values close to the first candidate value to set as second candidate values, (3) measuring strength of a digital clock extracting signal corresponding to each candidate value, (4) extracting an optimum value (the value which becomes the largest) from the tendency of fluctuation of the plural signal strength and to set the value as the next first candidate value, (5) performing evaluation while repeating (2) to (4) until a specific condition is satisfied.

Specifically, the wavelength dispersion amount estimation method according to the present invention is a wavelength dispersion amount estimation method to estimate a dispersion compensation amount for compensating waveform distortion due to wavelength dispersion at an optical fiber transmission path, performing an initial value setting step to set a dispersion compensation amount $D(0)$ which is an initial value ($k=0$) of a kth dispersion compensation amount $D(k)$ ($k$ is an integer), a clock detecting step to detect and store strength of a symbol arrival timing clock included in received data at the dispersion compensation amount $D(k)$ as a clock detection value $S(k)$, a plus side shifting step to detect and store strength of the symbol arrival timing clock at a dispersion compensation amount $D(k)+\Delta D/M^{(k-1)}$ ($M$ is a real number not less than 1) which is obtained by shifting the dispersion compensation amount $D(k)$ to a plus side by $\Delta D/M^{(k-1)}$ as a clock detection value $S(k+)$, a minus side shifting step to detect and store strength of the symbol arrival timing clock at a dispersion compensation amount $D(k)-\Delta D/M^{(k-1)}$ which is obtained by shifting the dispersion compensation amount $D(k)$ to a minus side by $\Delta D/M^{(k-1)}$ as a clock detection value $S(k-)$, a comparing step to compare the clock detection value $S(k)$, the clock detection value $S(k+)$, and the clock detection value $S(k-)$, and an evaluating step to determine to complete estimation of the dispersion compensation amount as determining the dispersion compensation amount $D(k)$ as an optimum dispersion compensation amount when the clock detection value $S(k)$ is the largest, and to perform the clock detecting step, the plus side shifting step, the minus side shifting step, and the comparing step once again with the dispersion compensation amount of the largest clock detection value set as a k+1th dispersion compensation amount $D(k+1)$ when the clock detection value $S(k+)$ or the clock detection value $S(k-)$ is the largest, as a result of the comparing step.

When a clock detection value of a dispersion compensation amount and a clock detection value of a dispersion compensation amount in the vicinity thereof are compared, it is conceivable that an optimum clock detection value, that is, an optimum dispersion compensation amount exists in the direction of the dispersion compensation amount with a larger clock detection value. Accordingly, the optimum dispersion compensation amount can be obtained by comparing the clock detection values in a comparing step and adjusting the dispersion compensation amount to the direction which enlarges the clock detection value. Further, the wavelength dispersion amount can be rapidly estimated with high accuracy while avoiding overshooting by setting the second candidate value of step (2) in the vicinity of the first candidate value in accordance with the trial number.

Accordingly, the present invention can provide a wavelength dispersion amount estimation method which rapidly estimates and sets a wavelength dispersion amount to compensate with high accuracy at a receiving device which compensates waveform distortion at an optical fiber transmission path.

The wavelength dispersion amount estimation method according to the present invention includes an approximate dispersion compensation amount acquiring step in which an approximate value of the dispersion compensation amount is acquired before the initial value setting step and the approximate value of the dispersion compensation amount is set as the dispersion compensation amount $D(0)$ in the initial value setting step.

In the first step, a coarse estimated value is set as the initial value of the dispersion compensation amount estimated with a wavelength dispersion estimation method using a known signal (e.g., see Patent Literature 4) or the like. Estimation of an optimum dispersion compensation amount can be performed in a short time by performing a step to perform fine adjustment after the first step.

In the wavelength dispersion amount estimation method according to the present invention, at least one of the clock detecting step, the plus side shifting step, and the minus side shifting step is repeated several times at different time to perform averaging.

Stabilization can be achieved even when local variation exists by averaging the clock detection values through time.

In the wavelength dispersion amount estimation method according to the present invention, a minute amount $\delta D$ which is smaller than the predetermined amount $\Delta D$ for shifting the dispersion compensation amount in the plus side shifting step and the minus side shifting step is set, a clock detection value $S(k\pm 0)$ at the dispersion compensation amount $D(k)$, which is a center value and clock detection values $S(k\pm n\delta)$ at dispersion compensation amounts $D(k)\pm n\delta D$ ($n$ is a natural number) around the dispersion compensation amount D(k) are detected in the clock detecting step, a clock detection value S(k±0+) at the dispersion compensation amount D(k)+ΔD/M$^{(k-1)}$ and clock detection values S(k±nδ+) at dispersion compensation amounts D(k)+ΔD/M$^{(k-1)}$±nδD(n is a natural number) around the dispersion compensation amount D(k)+ΔD, which is the center value are detected in the plus side shifting step, and a clock detection value S(k±0−) at the dispersion compensation amount D(k)−ΔD/M$^{(k-1)}$ and clock detection values S(k±nδ−) at dispersion compensation amounts D(k)−ΔD/M$^{(k-1)}$±nδD(n is a natural number) around the dispersion compensation amount D(k)−ΔD, which is the center value are detected in the minus side shifting step.

Stabilization can be achieved even when local variation exists by averaging the clock detection values around the dispersion compensation amount.

In the wavelength dispersion amount estimation method according to the present invention, the clock detection value S(k) is obtained by averaging the clock detection value S(k±0) and the clock detection values S(k±nδ), the clock detection value S(k+) is obtained by averaging the clock detection value S(k±0+) and the clock detection values S(k±nδ+), and the clock detection value S(k−) is obtained by averaging the clock detection value S(k±0−) and the clock detection values S(k±nδ−).

Stabilization can be achieved even when local variation exists by averaging the clock detection values around the dispersion compensation amount.

In the wavelength dispersion amount estimation method according to the present invention, estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

Estimation operation can be stabilized by avoiding to perform estimation in a state that difference among the clock detection values are small and the direction of which the optimum value exists is uncertain.

The wavelength dispersion compensation circuit according to the present invention includes an analog-digital convertor which converts optical analog waveform received from the optical fiber transmission path into a digital signal, a digital signal processor which compensates waveform distortion due to wavelength dispersion at the optical fiber transmission path of the digital signal output from the analog-digital convertor with the dispersion compensation amount estimated with the wavelength dispersion amount estimation method, and a symbol clock extractor which extracts a symbol arrival timing clock of received data included in the digital signal output from the analog-digital convertor and outputs strength of the symbol arrival timing clock as the clock detection value.

The wavelength dispersion compensation circuit according to the present invention adopts the wavelength dispersion estimation method. Accordingly, the present invention can provide a wavelength dispersion compensation circuit which rapidly estimates and sets a wavelength dispersion amount to compensate with high accuracy at a receiving device which compensates waveform distortion at an optical fiber transmission path.

The receiving device according to the present invention includes the wavelength dispersion compensation circuit.

The receiving device according to the present invention includes the wavelength dispersion compensation circuit.

Accordingly, the present invention can provide a receiving device which rapidly estimates and sets a wavelength dispersion amount to compensate with high accuracy at a receiving device which compensates waveform distortion at an optical fiber transmission path.

Advantageous Effects of Invention

The present invention can provide a wavelength dispersion amount estimation method, a wavelength dispersion compensation circuit, and a receiving device which rapidly and efficiently estimate and set a wavelength dispersion amount to compensate at a receiving device which compensates waveform distortion at an optical fiber transmission path.

DESCRIPTION OF EMBODIMENTS

Embodiments of the present invention will be described with reference to the attached drawings. Embodiments described below are examples of the present invention and the present invention is not limited to the following embodiments. In the present application and drawings, the same structural elements are denoted by the same reference.

Figure 5:
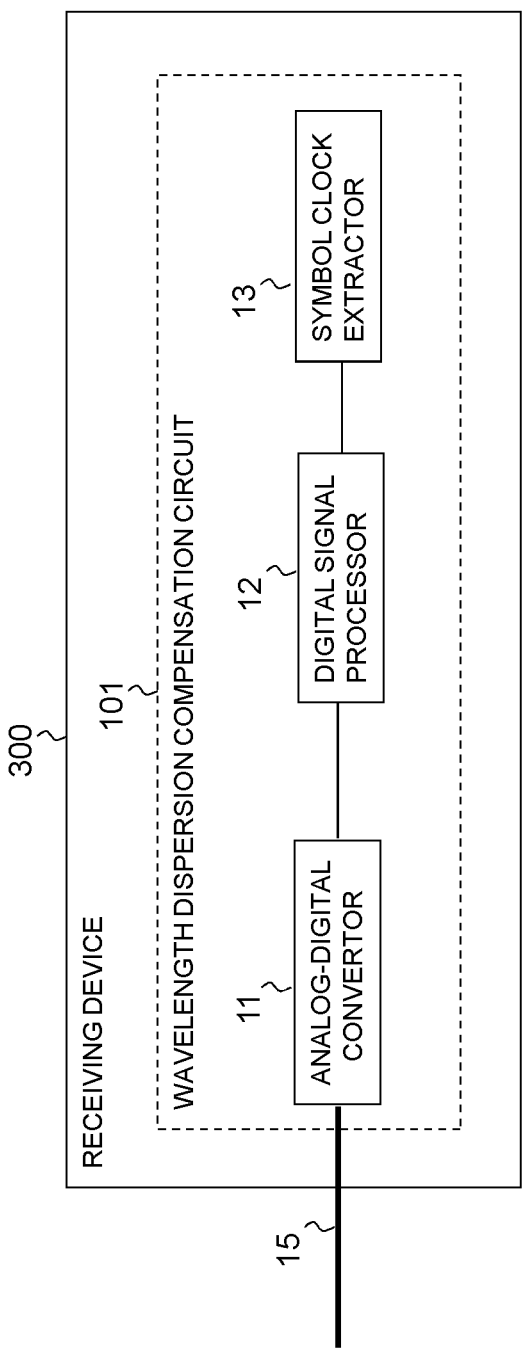
FIG. 5 is an explanatory view of a receiving device according to the present invention.

FIG. 5 is an explanatory view of a receiving device 300 according to the present embodiment. The receiving device 300 includes a wavelength dispersion compensation circuit 101. The wavelength dispersion compensation circuit 101 includes an analog-digital converter 11 which converts an optical analog waveform received from an optical fiber transmission path to a digital signal, a digital signal processor 12 which compensates waveform distortion of the digital signal output from the analog-digital converter 11 due to wavelength dispersion of the optical fiber transmission path with a dispersion compensation amount estimated with a wavelength dispersion amount estimation method described in the following, and a symbol clock extractor 13 which extracts a symbol arrival timing clock of received data contained in the digital signal output from the analog-digital converter 11 and outputs strength of the symbol arrival timing clock as the clock detection value.

Embodiments of the wavelength dispersion amount estimation method performed by the digital signal processor 12 will be described.

First Embodiment

First, as a coarse adjustment process, a coarse estimated value estimated by a wavelength dispersion estimation method using a known signal or the like is set to a dispersion compensation circuit as an initial value. At this time, most part of the wavelength dispersion is compensated and a waveform receiving waveform distortion due to residual dispersion occurring for an estimation error and the like is output from the dispersion compensation circuit.

Figure 1:
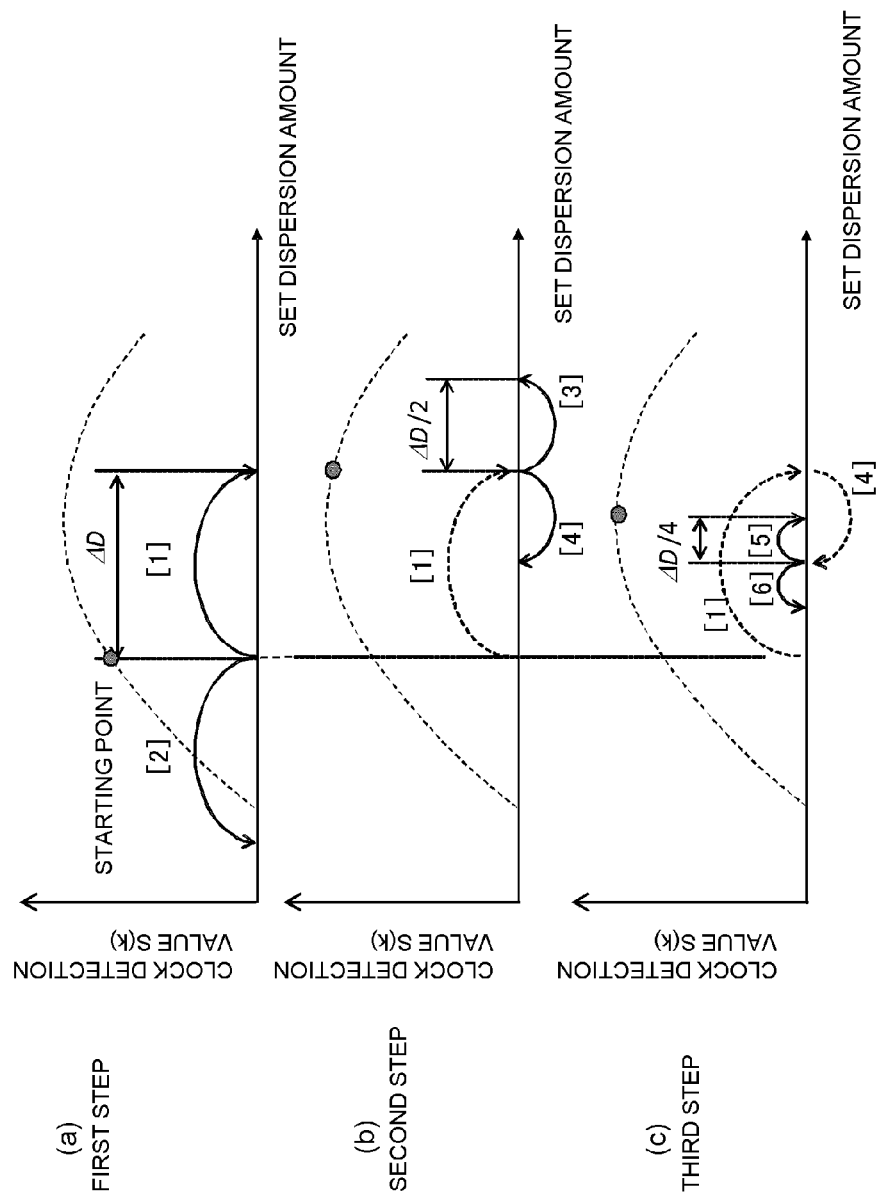
FIG. 1 is explanatory view of a wavelength dispersion amount estimation method according to the present invention.
Figure 2:
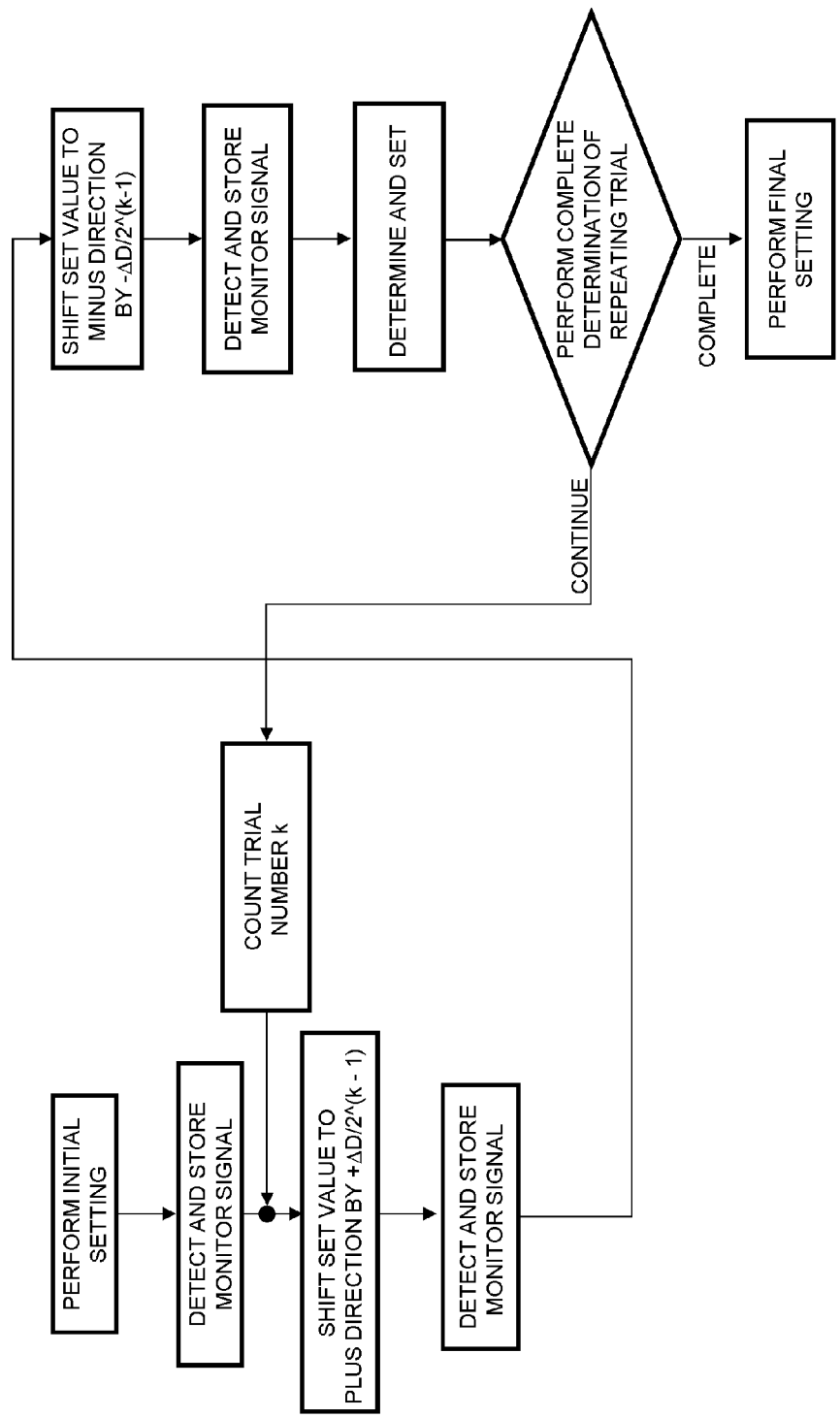
FIG. 2 is a flow diagram illustrating the wavelength dispersion amount estimation method according to the present invention.

Subsequently, a fine adjustment process starts. FIGS. 1(a) to 1(c) and FIG. 2 are explanatory views of the fine adjustment process according to the present embodiment. D(k) denotes a dispersion compensation amount set to the digital signal processor 12. First, as the first step, a dispersion compensation amount D(0) for the initial value k=0 is set and a detection signal value of clock synchronization is measured and stored on a memory. This value is denoted as a clock detection value S(0). Next, following processes are performed as the first step as illustrated in FIG. 1(a).

[1] The dispersion compensation amount is shifted to the plus direction by a constant shift value $\Delta D$ from the dispersion compensation amount D(0) (dispersion compensation amount D(0)+$\Delta$). Then, a clock detection value S(0+) of clock synchronization is measured and stored.

[2] Similarly, the dispersion compensation amount is shifted to the minus direction by the constant shift value $\Delta D$ from the dispersion compensation amount D(0) (dispersion compensation amount D(0)−$\Delta$). A clock detection value S(0−) of clock synchronization at that time is measured and stored.

The constant shift value $\Delta D$ is set to the order of a maximum value of a gap amount of the initial value from an expected value. Here, the initial value depends on a coarse estimation algorithm (e.g., an algorithm of Patent Literature 4) to be used. For example, $\Delta D$ is set in a range of 300 to 1000 psec/nm with an assumption that an error is in a range of 1.5% to 5% of a dispersion amount 20000 psec/nm exemplified in Patent Literature 4 as a compensation range.

It is conceivable that an optimum value exists in the sign direction where the clock detection value is large. Therefore, S(0), S(0+), and S(0−) are compared. When the clock detection value satisfies S(0+)>S(0−), a next dispersion compensation amount D(1) is set to D(0)+$\Delta D$. Conversely, when the clock detection value satisfies S(0+)<S(0−), the next dispersion compensation amount D(1) is set to D(0)−$\Delta D$. When both of S(0+) and S(0−) are smaller than S(0), that is, when S(0)>S(0+) and S(0)>S(0−) are satisfied, the dispersion compensation amount D(1) is set to D(0).

Here, assuming a case of S(0+)>S(0−), following processes will be described as the dispersion compensation amount D(1) is set to D(0)+$\Delta D$.

As a second step illustrated in FIG. 1(b), the dispersion compensation amount is shifted to the plus direction and the minus direction by a shift amount $\Delta D/2$ from the dispersion compensation amount D(1)=D(0)+$\Delta D$, which is the center value ([3] [4]). Clock detection values S(1+), S(1−) when the dispersion compensation amount is set to D(1)+$\Delta D/2$, D(1)−$\Delta D/2$ respectively are detected and stored on the memory. Then, comparing the both, a compensation dispersion amount D(2) is set to D(1)+$\Delta D/2$ when S(1+)>S(1−) is satisfied and D(1)−$\Delta D/2$ when S(1+)<S(1−) is satisfied. Further, a case that both S(1+) and S(1−) are smaller than S(1), that is, S(1)>S(1+) and S(1)>S(1−) is conceivable as well. In this case, D(2) is set to D(1). Here, following descriptions will be performed with the compensation dispersion amount D(2) set to D(1)−$\Delta D/2$ assuming a case satisfying S(1+)<S(1−).

As a third step, the dispersion compensation amount is shifted to the plus direction and the minus direction by a shift amount $\Delta D/4$ from the compensation dispersion amount D(2), which is the center value ([5] [6]). Clock synchronization detection signals S(2+), S(2−) when the dispersion compensation amount is shifted to the plus direction and the minus direction respectively are detected and stored on the memory. Then, the both are compared and shifting is performed to a larger sign direction. An optimum compensation dispersion amount can be asymptotically acquired by repeating the similar processes thereafter. Here, the shift amount of a compensation dispersion amount D(k) in the kth step is set to $\Delta D/(2^{(k-1)})$ to be halved for each proceeding process.

In this manner, the process is repeated with the shift amount halved as $\Delta D/2$, $\Delta D/4$, $\Delta D/8$, . . . . The number of repeating time is required to be set so that repeating is performed until the shift amount becomes smaller than the final target error range. For example, when $\Delta D$ is set to 1024 psec/nm and the target error is set to 50 psec/nm, the shift amount varies as 1024, 512, 256, 126, 64, 32, and 16 (psec/nm) for each process. Accordingly, the process is required to be repeated for about six or seven times until the shift amount becomes smaller than the target error. The process may be repeated until the shift amount becomes further smaller if time allows.

Here, since the detection signal primarily includes an error, there is an opportunity to set S(k) again and redo measurement when difference among S(k+), S(k−), and S(k) are smaller than the set threshold value. Owing to the above, risk of inducing unstable operation by shifting on a basis of uncertain information can be reduced in a situation where the difference is small and the direction in which the optimum value exists is uncertain to be whether plus or minus. Here, the shift amount for the compensation dispersion amount D(k) is halved for each step, that is, described as $\Delta D/(2^{(k-1)})$ in the above example. However, the shift amount may be set to $\Delta D/(M^{(k-1)})$ (M is a real number not less than 1).

In the above method, the process determines the set value of the dispersion compensation amount with one measurement value of the clock detection signal for each set value. Accordingly, when an error of S(k) at each measurement is large, there is a possibility that the sequence of optimization becomes an unstable operation. As a method for stabilization, by measuring plural times at different time for each set value and determining which direction of plus or minus sign to shift by comparing the average value thereof, stabilization of the operation is expected.

In the above example, a coarse estimated value of the dispersion estimation circuit is used as the initial value of the dispersion compensation amount. However, there are cases that an externally provided dispersion value is set. As such an example, a case is conceivable such as that a dispersion amount of a transmission path is previously measured with a dispersion measuring machine.

Second Embodiment

There is a possibility that residual dispersion dependence of the detection signal of the clock synchronization circuit locally surges. In this case, in the first embodiment, there are cases that determination of whether to shift to the plus direction or to shift to the minus direction is difficult owing to the local variation. According to the present embodiment, the dispersion compensation amount can be stably estimated by determining the shift direction of the dispersion compensation amount with high accuracy owing to averaging even in a situation that local residual dispersion dependence exists.

Figure 3:
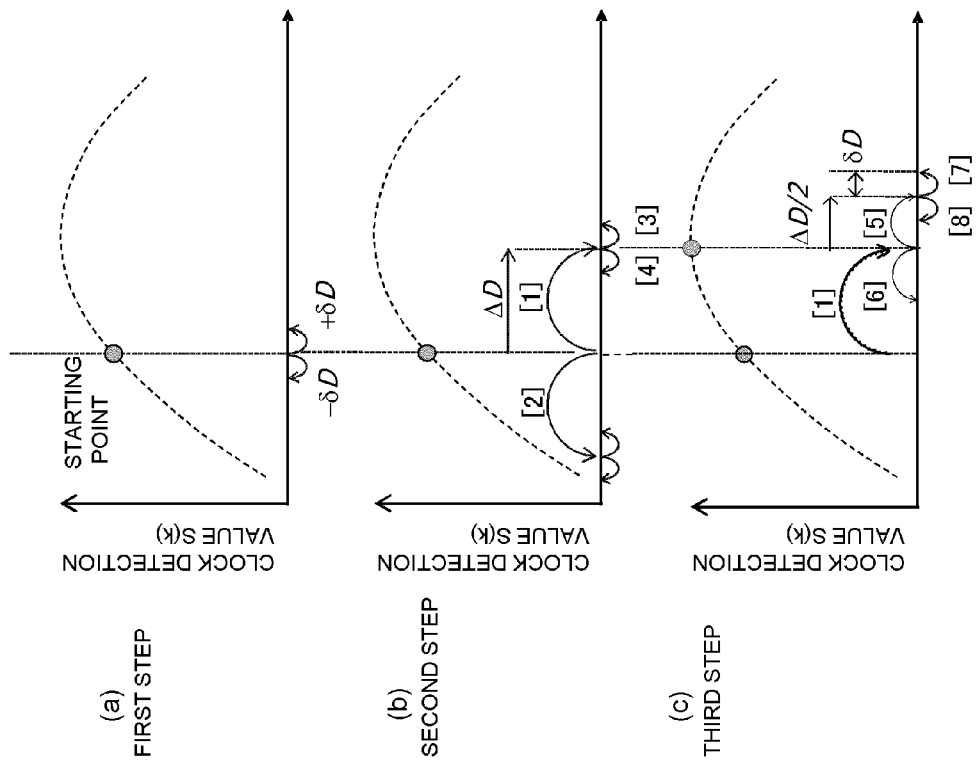
FIG. 3 is explanatory view of the wavelength dispersion amount estimation method according to the present invention.

FIGS. 3(a) to 3(c) are explanatory views of a fine adjustment process according to the present embodiment. In the initial step, a coarse estimated dispersion compensation amount D(0) estimated by a wavelength dispersion estimation method using a known signal or the like is set to the dispersion compensation circuit as an initial value. At this time, most part of the wavelength dispersion is compensated and a waveform receiving waveform distortion due to residual dispersion occurring for an estimation error and the like is output from the dispersion compensation circuit.

Figure 4:
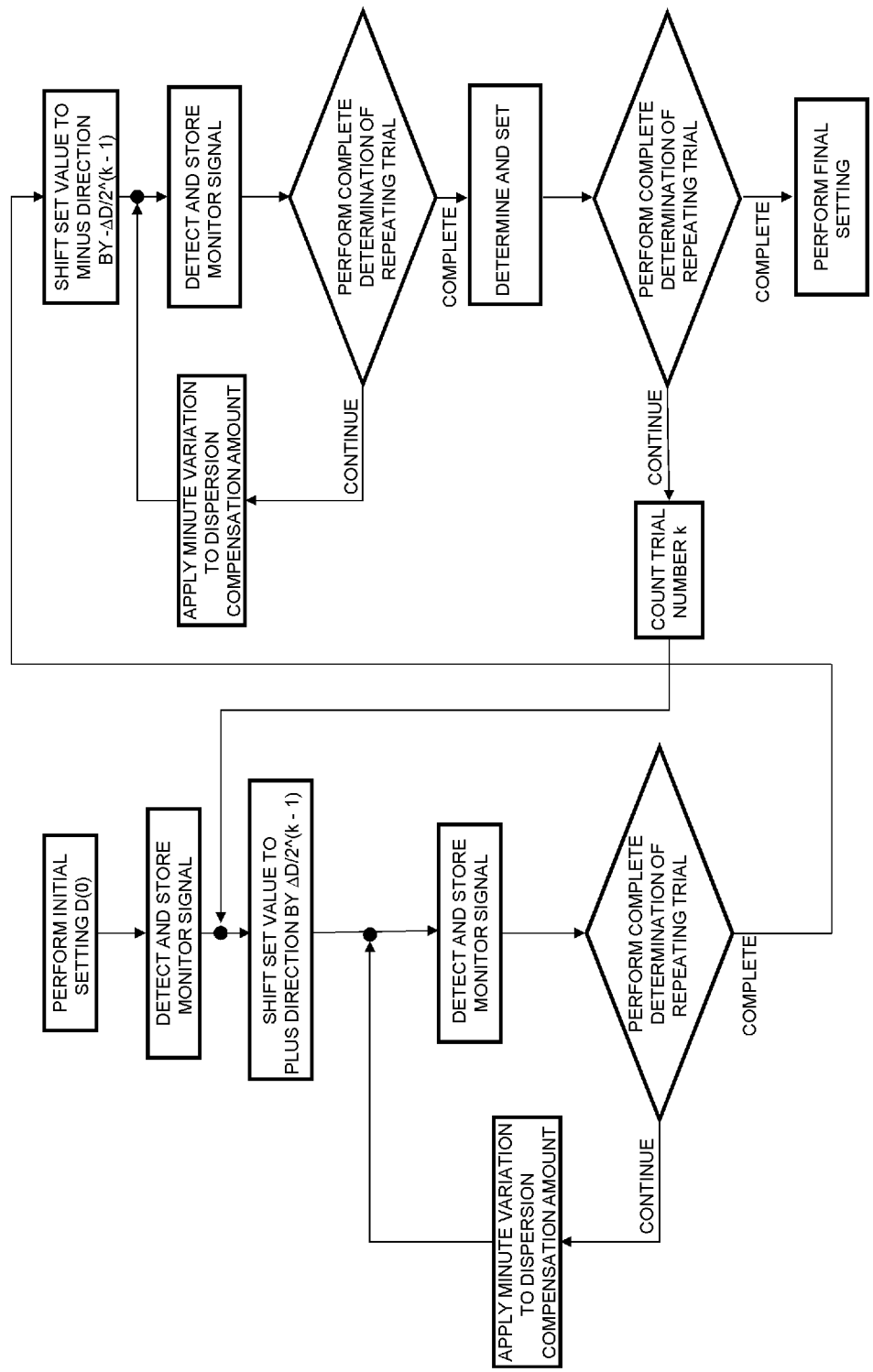
FIG. 4 is a flow diagram illustrating the wavelength dispersion amount estimation method according to the present invention.

In the initial step, a clock detection value S(0) of the clock synchronization at the dispersion compensation amount D(0) which is initially set is measured and stored. Next, as the first step illustrated in FIG. 3(a), the dispersion compensation set value is shifted to the plus direction by a minute amount δD from D(0). Then, a clock detection value S(0+δ) of the clock synchronization is measured and stored. Further, shifting may be performed to the plus direction by δD each and clock detection values S(0+2δ), S(0+3δ), ..., S(0+nδ) of the clock synchronization may be measured and stored on the memory at points of 2δD, 3δD, .... Further, shifting is performed to the minus direction by the minute amount δD and a clock detection value S(0−δ) of the clock synchronization at that time is measured and stored on the memory. Similarly, shifting may be performed to the minus direction by δD each and clock detection values S(0−2δ), S(0−3δ), ..., S(0−nδ) of the clock synchronization may be measured and stored on the memory at points of −2δD, −3δD, .... FIG. 4 illustrates a control block diagram of this operation. The above is repeated for N times. Here, an example measuring number of points evenly for the plus and minus is described. However, it is not required to measure number of points evenly for plus and minus especially. For example, measurement may be performed for only D(0) and D(0)+δD.

The minute amount δD is set based on a cycle and amplitude of a ripple occurring at a clock detection value S(k) for the dispersion compensation amount of FIGS. 3(a) to 3(c). Specifically, the minute amount δD may be equal to or less than the cycle of the ripple. For example, when the amplitude of the ripple is about 10% of the clock detection value S(k), an average varying amount of the clock detection value S(k) at the time of shifting the set dispersion compensation amount D(k) by δD is to be less than 10% of the clock detection value S(k).

Further, the minute amount δD is set to be sufficiently smaller than the standard variation of the final target error when the cycle of the ripple varies depending on conditions. For example, δD may be set in a range of one third to one fiftieth of the target error, preferably in a range of one fifth to one twentieth thereof, and further preferably in a range of one seventh to one twentieth thereof. Further, as a specific numeral, when the target error is in a range of 50 to 150 psec/nm, δD may be set in a range of about 1 to 50 psec/nm and preferably in a range of about 4 to 30 psec/nm. When δD is varied in accordance with k, variation is performed as δD/(2^(k−1)) being similar to ΔD. In this case, δD can be set in a range of one third to one fiftieth of ΔD, preferably in a range of one fifth to one tenth thereof, and further preferably in a range of one fifth to one seventh thereof.

Next, S(0+) is detected and stored on the memory by shifting to the plus direction by the shift amount ΔD from D(0), which is the center value ([1]). Then, clock detection values S(0±nδ+) of the symbol clock extracting circuit are detected and stored on the memory by further shifting by δD in sequence respectively to the plus direction and the minus direction. Similarly, S(0−) and S(0±nδ−) are detected and stored on the memory by shifting to the minus direction by the shift amount ΔD from D(0), which is the center value ([2]). Here, in general, ΔD>δD is satisfied.

Next, a sign direction in which the detection signal of the clock synchronization becomes large is determined in a comprehensive manner by comparing the clock detection values S(0±nδ), S(0±nδ+), S(0±nδ−) when the dispersion compensation values D(0), D(0)+ΔD, D(0)−ΔD are set as the center value and they are shifted therefrom to the plus direction and the minus direction by the minute amount respectively. Then, the dispersion compensation value is shifted. As an example of determining in a comprehensive manner, averaging procedure may be performed to n for each of S(0±nδ), S(0±nδ+), S(0±nδ−), and each average value Savg(0), Savg(0+), Savg(0−) may be calculated. For example, a calculation example of Savg(0+) may be defined as the following expression.

$$Savg(0+) = \sum_{n=0}^{N} S(0+\pm n\delta) \quad \text{[Expression 1]}$$

Here, N is set considering the balance between accuracy and time as well. However, limitation is placed by the relation between ΔD and δD when δD is fixed. Since error cannot be reduced when δD>ΔD(2^(N−1)) is satisfied, N is set to satisfy the above condition. For example, N is set three or more and seven or less.

A dispersion compensation amount D(1) is set to D(0)+ΔD when the detection signal average values satisfy Savg(0+)>Savg(0−). In contrast, the dispersion compensation amount D(1) is set to D(0)−ΔD when the detection values satisfy Savg(0+)<Savg(0−). Further, in a case that both Savg (0+) and Savg(0−) are smaller than Savg(0), that is, Savg(0)>Savg(0+) and Savg(0)>Savg(0−) is conceivable as well. In this case, D(1) is set to D(0). Here, following processes will be described with D(1) set to D(0)+ΔD assuming a case satisfying Savg(0+)>Savg(0−).

As similar to the first embodiment, according to the control method in the second step and later, clock detection values at points of the dispersion compensation amounts D(1), D(1)+ Δ/2, and D(1)−Δ/2 are compared and the plus/minus shifting direction is determined. Further, to improve reliability of the determination of plus/minus shifting direction as described in the first step, the plus/minus shift direction is determined by shifting by δD each in the plus and minus direction in the vicinity of each point and using the averaged clock detection value.

Firstly, clock detection values S(1±nδD) are acquired ([3] [4]) by shifting to the plus and minus direction by n×δD from D(1)=D(0)+ΔD, which is the center value. Further, Savg(1) to which averaging procedure is performed is acquired using the detection values.

Next, clock detection values S(1±nδ+) are acquired ([7] [8]) by shifting to the plus and minus direction by minute amounts n×δD each from the dispersion compensation amount D(1)+ΔD/2, which is the center value after shifting the dispersion compensation amount to the plus direction by the dispersion compensation amount ΔD/2 ([1]). Further, Savg(1+) to which averaging procedure is performed is acquired using the detection values. Similarly, clock detection values S(1±nδ−) are acquired by shifting to the plus and minus direction by the minute amounts n×δD each from D(1)−ΔD/2, which is the center value after shifting the dispersion compensation amount to the minus direction by shift amount ΔD/2 ([2]). Further, Savg(1−) to which averaging procedure is performed is acquired using the detection values.

Further, Savg(1), Savg(1+), and Savg(1−) are compared to determine the plus and minus shift direction of the compensation dispersion in which the detection signal becomes larger. A compensation dispersion amount D(2) is set to D(1)+ΔD/2 when Savg(1+)>Savg(1−) is satisfied. The dispersion compensation amount D(2) is set to D(1)−ΔD/2 when Savg(1+)<Savg(1−) is satisfied. Further, in a case that both Savg(1+) and Savg(1−) are smaller than S(1), that is, Savg(1)>Savg(1+) and Savg(1)>Savg(1−) is conceivable as well. In this case, D(2) is set to D(1). Here, D2 may be set to D1 when difference among Savg(1), Savg(1+), and Savg(1−) are equal to or smaller than a predetermined value such as being smaller than the error.

Here, following description will be performed with the compensation dispersion amount D(2) set to D(1)−ΔD/2 assuming a case satisfying Savg(1+)<Savg(1−).

The plus and minus shift direction of the compensation dispersion amount is determined in the third step as similarly to the above description. Comparison of the clock detection values is performed among the point where the compensation dispersion amount is set to D(2), which is the center value and points shifted to the plus and minus direction by ΔD/4 from D(2), that is, three points being D(2), D(2)+ΔD/4, and D(2)−ΔD/4. In the third step, the shift amount is further halved to ΔD/4. Clock detection values S(1±nδ), S(1±nδ+), and S(1±nδ−) at points shifted to the plus and minus direction by minute amounts n×±ΔD at each of the three points are acquired. Further, average values of the above, Save (2), Savg(2+), and Savg(2−) are acquired and the direction to shift in the next step is determined as described in the second step.

An optimum dispersion compensation amount can be asymptotically acquired by repeating the similar processes thereafter. Here, the shift amount of a compensation dispersion amount D(k) in the kth step is set to $\Delta D/(2^{(k-1)})$ to be halved for each proceeding process. In the above example, the shift amount for the compensation dispersion amount D(k) is halved for each step, that is, described as $\Delta D/(2^{(k-1)})$. However, the shift amount may be set to $\Delta D/(M^{(k-1)})$ as similar to the first embodiment.

In the above description, an example in which the minute amount for the averaging procedure is a constant value is described although the shift amount is halved as ΔD, ΔD/2, ΔD/4, . . . in each step. In this example, optimization of the dispersion compensation amount cannot be performed in a unit finer than δD. Then, the minute amount δD may be set to a small range where averaging is effective according to the shift amount is halved as ΔD, ΔD/2, ΔD/4, . . . in each step. For example, the minute amount may be varied in little as δD, δD/2, δD/4, . . . .

INDUSTRIAL APPLICABILITY

As described above, according to the present invention, an optimum dispersion compensation amount can be detected efficiently by applying minute variation to a compensation amount of the wavelength dispersion compensation circuit of an optical communication system and halving the applying variation amount for every trial number at the time of searching the optimum compensation amount with the clock detection signal as the monitor signal.

REFERENCE SIGNS LIST

11 Analog-digital convertor
12 Digital signal processor
13 Symbol clock extractor
15 Optical fiber
101 Wavelength dispersion compensation circuit
300 Receiving device

What is claimed is:

1. A wavelength dispersion amount estimation method to estimate a dispersion compensation amount for compensating waveform distortion due to wavelength dispersion at an optical fiber transmission path, comprising:
   an initial value setting step to set a dispersion compensation amount D(0) which is an initial value (k=0) of a kth dispersion compensation amount D(k) (k is an integer);
   a clock detecting step to detect and store strength of a symbol arrival timing clock included in received data at the dispersion compensation amount D(k) as a clock detection value S(k);
   a plus side shifting step to detect and store strength of the symbol arrival timing clock at a dispersion compensation amount $D(k)+\Delta D/M^{(k-1)}$ (M is a real number not smaller than one) which is obtained by shifting the dispersion compensation amount D(k) to a plus side by predetermined amount $\Delta D/M^{(k-1)}$ as a clock detection value S(k+);
   a minus side shifting step to detect and store strength of the symbol arrival timing clock at a dispersion compensation amount $D(k)-\Delta D/M^{(k-1)}$ which is obtained by shifting the dispersion compensation amount D(k) to a minus side by predetermined amount $\Delta D/M^{(k-1)}$ as a clock detection value S(k−);
   a comparing step to compare the clock detection value S(k), the clock detection value S(k+), and the clock detection value S(k−); and
   an evaluating step to determine to complete estimation of the dispersion compensation amount as determining the dispersion compensation amount D(k) as an optimum dispersion compensation amount when the clock detection value S(k) is the largest, and to perform once again the clock detecting step, the plus side shifting step, the minus side shifting step, and the comparing step with the dispersion compensation amount of the largest clock detection value set as a k+1th dispersion compensation amount D(k+1) when the clock detection value S(k+) or the clock detection value S(k−) is the largest, as a result of the comparing step.

2. The wavelength dispersion amount estimation method according to claim 1, further comprising an approximate dispersion compensation amount acquiring step in which an approximate value of the dispersion compensation amount is acquired before the initial value setting step and the approximate value of the dispersion compensation amount is set as the dispersion compensation amount D(0) in the initial value setting step.

3. The wavelength dispersion amount estimation method according to claim 2, wherein at least one of the clock detecting step, the plus side shifting step, and the minus side shifting step is repeated several times at different times to perform averaging.

4. The wavelength dispersion amount estimation method according to claim 2,
   wherein a minute amount δD which is smaller than the predetermined amount ΔD for shifting the dispersion compensation amount in the plus side shifting step and the minus side shifting step is set,
   a clock detection value S(k±0) at the dispersion compensation amount D(k), which is the center value and clock detection values S(k±nδ) at dispersion compensation amounts D(k)±nδD (n is a natural number) around the dispersion compensation amount D(k) are detected in the clock detecting step,
   a clock detection value S(k±0+) at the dispersion compensation amount $D(k)+\Delta D/M^{(k-1)}$ and clock detection values $S(k\pm n\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and a clock detection value $S(k\pm 0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

5. The wavelength dispersion amount estimation method according to claim 4, wherein the clock detection value $S(k)$ is obtained by averaging the clock detection value $S(k\pm 0)$ and the clock detection values $S(k\pm n\delta)$, the clock detection value $S(k+)$ is obtained by averaging the clock detection value $S(k\pm 0+)$ and the clock detection values $S(k\pm n\delta+)$, and the clock detection value $S(k-)$ is obtained by averaging the clock detection value $S(k\pm 0-)$ and the clock detection values $S(k\pm n\delta-)$.

6. The wavelength dispersion amount estimation method according to claim 2, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

7. The wavelength dispersion amount estimation method according to claim 1, wherein at least one of the clock detecting step, the plus side shifting step, and the minus side shifting step is repeated several times at different times to perform averaging.

8. The wavelength dispersion amount estimation method according to claim 1, wherein a minute amount $\delta D$ which is smaller than the predetermined amount $\Delta D$ for shifting the dispersion compensation amount in the plus side shifting step and the minus side shifting step is set, a clock detection value $S(k\pm 0)$ at the dispersion compensation amount $D(k)$, which is the center value and clock detection values $S(k\pm n\delta)$ at dispersion compensation amounts $D(k)\pm n\delta D$ (n is a natural number) around the dispersion compensation amount $D(k)$ are detected in the clock detecting step, a clock detection value $S(k\pm 0+)$ at the dispersion compensation amount $D(k)+\Delta D/M^{(k-1)}$ and clock detection values $S(k\pm n\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and a clock detection value $S(k\pm 0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

9. The wavelength dispersion amount estimation method according to claim 8, wherein the clock detection value $S(k)$ is obtained by averaging the clock detection value $S(k\pm 0)$ and the clock detection values $S(k\pm n\delta)$, the clock detection value $S(k+)$ is obtained by averaging the clock detection value $S(k\pm 0+)$ and the clock detection values $S(k\pm n\delta+)$, and the clock detection value $S(k-)$ is obtained by averaging the clock detection value $S(k\pm 0-)$ and the clock detection values $S(k\pm n\delta-)$.

10. The wavelength dispersion amount estimation method according to claim 1, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

11. A wavelength dispersion compensation circuit, comprising:

an analog-digital convertor which converts optical analog waveform received from the optical fiber transmission path into a digital signal;

a digital signal processor which compensates waveform distortion due to wavelength dispersion at the optical fiber transmission path of the digital signal output from the analog-digital convertor with the dispersion compensation amount estimated with a wavelength dispersion amount estimation method to estimate a dispersion compensation amount for compensating waveform distortion due to wavelength dispersion at an optical fiber transmission path; and a symbol clock extractor which extracts a symbol arrival timing clock of received data included in the digital signal output from the analog-digital convertor and outputs strength of the symbol arrival timing clock as the clock detection value, the wavelength dispersion amount estimation method is comprising:

an initial value setting step to set a dispersion compensation amount $D(0)$ which is an initial value ($k=0$) of a kth dispersion compensation amount $D(k)$ (k is an integer);

a clock detecting step to detect and store strength of a symbol arrival timing clock included in received data at the dispersion compensation amount $D(k)$ as a clock detection value $S(k)$;

a plus side shifting step to detect and store strength of the symbol arrival timing clock at a dispersion compensation amount $D(k)+\Delta D/M^{(k-1)}$ (M is a real number not smaller than one) which is obtained by shifting the dispersion compensation amount $D(k)$ to a plus side by predetermined amount $\Delta D/M^{(k-1)}$ as a clock detection value $S(k+)$;

a minus side shifting step to detect and store strength of the symbol arrival timing clock at a dispersion compensation amount $D(k)-\Delta D/M^{(k-1)}$ which is obtained by shifting the dispersion compensation amount $D(k)$ to a minus side by predetermined amount $\Delta D/M^{(k-1)}$ as a clock detection value $S(k-)$;

a comparing step to compare the clock detection value $S(k)$, the clock detection value $S(k+)$, and the clock detection value $S(k-)$; and an evaluating step to determine to complete estimation of the dispersion compensation amount as determining the dispersion compensation amount $D(k)$ as an optimum dispersion compensation amount when the clock detection value $S(k)$ is the largest, and to perform once again the clock detecting step, the plus side shifting step, the minus side shifting step, and the comparing step with the dispersion compensation amount of the largest clock detection value set as a k+1th dispersion compensation amount D(k+1) when the clock detection value S(k+) or the clock detection value S(k−) is the largest, as a result of the comparing step.

12. The wavelength dispersion compensation circuit according to claim 11, further comprising an approximate dispersion compensation amount acquiring step in which an approximate value of the dispersion compensation amount is acquired before the initial value setting step and the approximate value of the dispersion compensation amount is set as the dispersion compensation amount D(0) in the initial value setting step.

13. The wavelength dispersion compensation circuit according to claim 12, wherein at least one of the clock detecting step, the plus side shifting step, and the minus side shifting step is repeated several times at different times to perform averaging.

14. The wavelength dispersion compensation circuit according to claim 12,
wherein a minute amount $\delta D$ which is smaller than the predetermined amount $\Delta D$ for shifting the dispersion compensation amount in the plus side shifting step and the minus side shifting step is set,
a clock detection value $S(k\pm 0)$ at the dispersion compensation amount $D(k)$, which is the center value and clock detection values $S(k\pm\delta)$ at dispersion compensation amounts $D(k)\pm n\delta D$ (n is a natural number) around the dispersion compensation amount $D(k)$ are detected in the clock detecting step,
a clock detection value $S(k\pm 0+)$ at the dispersion compensation amount $D(k)+\Delta D/M^{(k-1)}$ and clock detection values $S(k\pm n\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and
a clock detection value $S(k\pm 0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

15. The wavelength dispersion compensation circuit according to claim 14,
wherein the clock detection value $S(k)$ is obtained by averaging the clock detection value $S(k\pm 0)$ and the clock detection values $S(k\pm n\delta)$,
the clock detection value $S(k+)$ is obtained by averaging the clock detection value $S(k\pm 0+)$ and the clock detection values $S(k\pm n\delta+)$, and
the clock detection value $S(k-)$ is obtained by averaging the clock detection value $S(k\pm 0-)$ and the clock detection values $S(k\pm n\delta-)$.

16. The wavelength dispersion compensation circuit according to claim 12, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

17. The wavelength dispersion compensation circuit according to claim 11, wherein at least one of the clock detecting step, the plus side shifting step, and the minus side shifting step is repeated several times at different times to perform averaging.

18. The wavelength dispersion compensation circuit according to claim 11,
wherein a minute amount $\delta D$ which is smaller than the predetermined amount $\Delta D$ for shifting the dispersion compensation amount in the plus side shifting step and the minus side shifting step is set,
a clock detection value $S(k\pm 0)$ at the dispersion compensation amount $D(k)$, which is the center value and clock detection values $S(k\pm n\delta)$ at dispersion compensation amounts $D(k)\pm n\delta D$ (n is a natural number) around the dispersion compensation amount $D(k)$ are detected in the clock detecting step,
a clock detection value $S(k\pm 0+)$ at the dispersion compensation amount $D(k)+\Delta D/M^{(k-1)}$ and clock detection values $S(k\pm n\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and
a clock detection value $S(k\pm 0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

19. The wavelength dispersion compensation circuit according to claim 18,
wherein the clock detection value $S(k)$ is obtained by averaging the clock detection value $S(k\pm 0)$ and the clock detection values $S(k\pm n\delta)$,
the clock detection value $S(k+)$ is obtained by averaging the clock detection value $S(k\pm 0+)$ and the clock detection values $S(k\pm n\delta+)$, and
the clock detection value $S(k-)$ is obtained by averaging the clock detection value $S(k\pm 0-)$ and the clock detection values $S(k\pm n\delta-)$.

20. The wavelength dispersion compensation circuit according to claim 11, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

21. A receiving device, comprising a wavelength dispersion compensation circuit which is comprising:
an analog-digital convertor which converts optical analog waveform received from the optical fiber transmission path into a digital signal;
a digital signal processor which compensates waveform distortion due to wavelength dispersion at the optical fiber transmission path of the digital signal output from the analog-digital convertor with the dispersion compensation amount estimated with a wavelength dispersion amount estimation method to estimate a dispersion compensation amount for compensating waveform distortion due to wavelength dispersion at an optical fiber transmission path; and
a symbol clock extractor which extracts a symbol arrival timing clock of received data included in the digital signal output from the analog-digital convertor and outputs strength of the symbol arrival timing clock as the clock detection value, the wavelength dispersion amount estimation method is comprising:

an initial value setting step to set a dispersion compensation amount $D(0)$ which is an initial value ($k=0$) of a kth dispersion compensation amount $D(k)$ (k is an integer);

a clock detecting step to detect and store strength of a symbol arrival timing clock included in received data at the dispersion compensation amount $D(k)$ as a clock detection value $S(k)$;

a plus side shifting step to detect and store strength of the symbol arrival timing clock at a dispersion compensation amount $D(k)+\Delta D/M^{(k-1)}$ (M is a real number not smaller than one) which is obtained by shifting the dispersion compensation amount $D(k)$ to a plus side by predetermined amount $\Delta D/M^{(k-1)}$ as a clock detection value $S(k+)$;

a minus side shifting step to detect and store strength of the symbol arrival timing clock at a dispersion compensation amount $D(k)-\Delta D/M^{(k-1)}$ which is obtained by shifting the dispersion compensation amount $D(k)$ to a minus side by predetermined amount $\Delta D/M^{(k-1)}$ as a clock detection value $S(k-)$;

a comparing step to compare the clock detection value $S(k)$, the clock detection value $S(k+)$, and the clock detection value $S(k-)$; and an evaluating step to determine to complete estimation of the dispersion compensation amount as determining the dispersion compensation amount $D(k)$ as an optimum dispersion compensation amount when the clock detection value $S(k)$ is the largest, and to perform once again the clock detecting step, the plus side shifting step, the minus side shifting step, and the comparing step with the dispersion compensation amount of the largest clock detection value set as a k+1th dispersion compensation amount $D(k+1)$ when the clock detection value $S(k+)$ or the clock detection value $S(k-)$ is the largest, as a result of the comparing step.

22. The receiving device according to claim 21, further comprising an approximate dispersion compensation amount acquiring step in which an approximate value of the dispersion compensation amount is acquired before the initial value setting step and the approximate value of the dispersion compensation amount is set as the dispersion compensation amount $D(0)$ in the initial value setting step.

23. The receiving device according to claim 22, wherein at least one of the clock detecting step, the plus side shifting step, and the minus side shifting step is repeated several times at different times to perform averaging.

24. The receiving device according to claim 22,
wherein a minute amount $\delta D$ which is smaller than the predetermined amount $\Delta D$ for shifting the dispersion compensation amount in the plus side shifting step and the minus side shifting step is set, a clock detection value $S(k\pm0)$ at the dispersion compensation amount $D(k)$, which is the center value and clock detection values $S(k\pm n\delta)$ at dispersion compensation amounts $D(k)\pm n\delta D$ (n is a natural number) around the dispersion compensation amount $D(k)$ are detected in the clock detecting step, a clock detection value $S(k\pm0+)$ at the dispersion compensation amount $D(k)+\Delta D/M^{(k-1)}$ and clock detection values $S(k\pm n\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and a clock detection value $S(k\pm0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

25. The receiving device according to claim 24,
wherein the clock detection value $S(k)$ is obtained by averaging the clock detection value $S(k\pm0)$ and the clock detection values $S(k\pm\delta)$, the clock detection value $S(k+)$ is obtained by averaging the clock detection value $S(k\pm0+)$ and the clock detection values $S(k\pm n\delta+)$, and the clock detection value $S(k-)$ is obtained by averaging the clock detection value $S(k\pm0-)$ and the clock detection values $S(k\pm n\delta-)$.

26. The receiving device according to claim 22, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

27. The receiving device according to claim 21, wherein at least one of the clock detecting step, the plus side shifting step, and the minus side shifting step is repeated several times at different times to perform averaging.

28. The receiving device according to claim 21,
wherein a minute amount $\delta D$ which is smaller than the predetermined amount $\Delta D$ for shifting the dispersion compensation amount in the plus side shifting step and the minus side shifting step is set, a clock detection value $S(k\pm0)$ at the dispersion compensation amount $D(k)$, which is the center value and clock detection values $S(k\pm n\delta)$ at dispersion compensation amounts $D(k)\pm n\delta D$ (n is a natural number) around the dispersion compensation amount $D(k)$ are detected in the clock detecting step, a clock detection value $S(k\pm0+)$ at the dispersion compensation amount $D(k)+\Delta D/M^{(k-1)}$ and clock detection values $S(k\pm\delta+)$ at dispersion compensation amounts $D(k)+\Delta D/M^{(k-1)}\pm n\delta D$ (n is a natural number) around the dispersion compensation amount $D(k)+\Delta D$, which is the center value are detected in the plus side shifting step, and a clock detection value $S(k\pm0-)$ at the dispersion compensation amount $D(k)-\Delta D/M^{(k-1)}$ and clock detection values $S(k\pm n\delta-)$ at dispersion compensation amounts $D(k)-\Delta D/M^{(k-1)}\pm n\delta D$ (n is a natural number) around the dispersion compensation amount $D(k)-\Delta D$, which is the center value are detected in the minus side shifting step.

29. The receiving device according to claim 28,
wherein the clock detection value $S(k)$ is obtained by averaging the clock detection value $S(k\pm0)$ and the clock detection values $S(k\pm n\delta)$, the clock detection value $S(k+)$ is obtained by averaging the clock detection value $S(k\pm0+)$ and the clock detection values $S(k\pm n\delta+)$, and the clock detection value $S(k-)$ is obtained by averaging the clock detection value $S(k\pm0-)$ and the clock detection values $S(k\pm n\delta-)$.

30. The receiving device according to claim 21, wherein estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

* * * * *